United States Patent [19]

Auracher et al.

[11] Patent Number: 4,965,857
[45] Date of Patent: Oct. 23, 1990

[54] METHOD FOR SYNCHRONIZED POLARIZATION SWITCHING OF AN OPTICAL TRANSMISSION SIGNAL OF AN OPTICAL TRANSMISSION SYSTEM HAVING SUPERHETERODYNE RECEPTION AND AN APPARATUS FOR THE IMPLEMENTATION OF SAID METHOD

[75] Inventors: Franz Auracher, Baierbrunn; Alfred Ebberg, Munich; Bernd Noll, Munich; Eckhard Meissner, Munich; Hermann-Johann Rodler, Bergen, all of Fed. Rep. of Germany

[73] Assignee: Siemens Aktiegesellschaft, Berlin and Munich, Fed. Rep. of Germany

[21] Appl. No.: 412,406

[22] Filed: Sep. 26, 1989

[30] Foreign Application Priority Data

Sep. 30, 1988 [DE] Fed. Rep. of Germany ....... 3833274

[51] Int. Cl.$^5$ .................. G02F 1/00; H04B 10/00; H01S 3/00
[52] U.S. Cl. .................... 455/618; 455/610; 455/616; 455/619; 455/608; 375/62; 375/67
[58] Field of Search ............... 455/618, 616, 610, 619, 455/608, 611; 375/62, 67

[56] References Cited

U.S. PATENT DOCUMENTS

| 4,724,534 | 2/1988 | Guzman-Edery et al. | 375/62 |
| 4,831,663 | 5/1989 | Smith | 455/612 |
| 4,893,352 | 1/1990 | Welford | 455/612 |
| 4,904,963 | 2/1990 | Heidel | 455/611 |

OTHER PUBLICATIONS

IEEE Journal of Quantum Electronics, vol. QE-13, No. 4, Apr. 1977, pp. 122-128.
Electronics Letters, 17th Mar. 1988, vol. 24, No. 6, pp. 358-360.
Electronics Letters, 4th Dec. 1986, vol. 22, No. 25, pp. 1341-1343.
Electronics Letters, 12th Feb. 1987, vol. 23, No. 4, pp. 168-169.
Electronics Letters, 7th May 1987, vol. 23, No. 10, pp. 513-514.

*Primary Examiner*—Joseph A. Orsino
*Assistant Examiner*—Kinfe-Michael Negash
*Attorney, Agent, or Firm*—Hill, Van Santen, Steadman & Simpson

[57] ABSTRACT

A method for generating an FSK-modulated optical signal with an optical two-filter FSK super-heterodyne receiver. The optical signal has two different polarization conditions that are orthogonal to one another. Due to orthogonal conditions, polarization-independent reception is possible. Synchronized polarization shifting occurs to generate a polarized modulated optical signal having alternating orthogonal polarization conditions. A delay stage for delaying the switching signal by one-half a clock period ensures accurate synchronization. The frequency shift of the FSK-modulated signal can be freely selected while maintaining excellent bandwidth characteristics and optimum sensitivity.

4 Claims, 1 Drawing Sheet

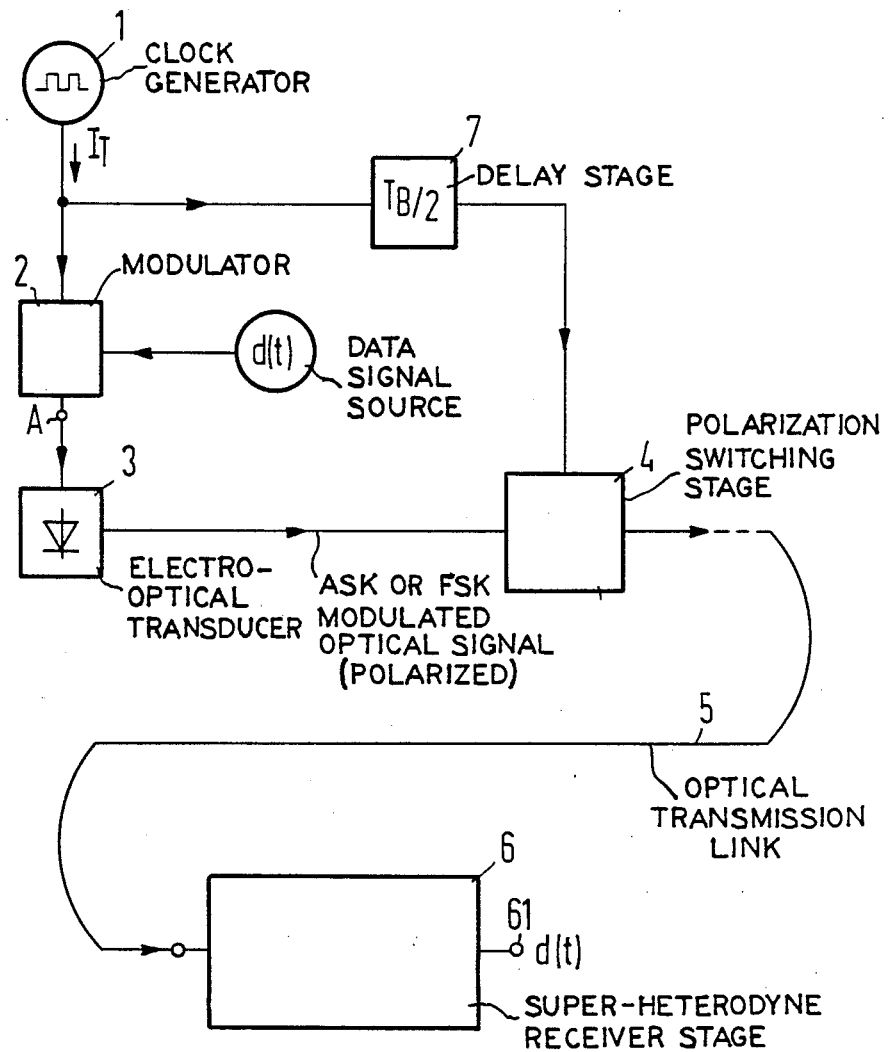

METHOD FOR SYNCHRONIZED POLARIZATION SWITCHING OF AN OPTICAL TRANSMISSION SIGNAL OF AN OPTICAL TRANSMISSION SYSTEM HAVING SUPERHETERODYNE RECEPTION AND AN APPARATUS FOR THE IMPLEMENTATION OF SAID METHOD

BACKGROUND OF THE INVENTION

1. Field of the Invention

The invention relates to a method for synchronized shifting or keying of a polarization condition of an optical transmission signal for an optical transmission system having super-heterodyne reception. The invention also relates to an apparatus for the implementation of the method.

2. Description of the Prior Art

In standard optical receivers having super-heterodyne reception such as optical heterodyne receivers, fluctuation of the amplitude of the intermediate frequency signal is dependent upon the relative position of the polarization conditions of the optical data signal and of the optical signal of a local oscillator. For optimum transmission quality, these fluctuations must be kept as low as possible. Common solutions are polarization follow-up with a control loop usually referred to as polarization control disclosed in Electron. Lett. 22 (1986), pp. 1341–1343; polarization quadrature reception, Electron. Lett. 22 (1987), pp. 168–169; and polarization scrambling, Electron. Lett. 23 (1987), pp. 513–514.

Receivers having polarization follow-up, theoretically achieve high sensitivity. However, the outlay for the control circuitry in such receivers is considerably large.

Polarization quadrature receivers represent a reliable alternative, but require a division of optical signals into two sub-signals that are polarized so that they are orthogonal to one another. Each of the sub-signals requires its own receiver. Both methods demand an increased outlay in the receiver. This drawback is problematical in many receiver applications.

In polarization scrambling, as opposed to receivers with polarization control, the increased outlay can be shifted onto the transmitter side. In this method, the polarization condition of the data signal is repeatedly switched between orthogonal states during the bit duration. This allows for the mean value of different polarization conditions to be represented by the intermediate frequency signal. Theoretically, the sensitivity loss in this method compared to the ideal polarization follow-up amounts to at least 3 dB. For high data rates, extremely fast polarization switches are required and the required receiver bandwidth is significantly increased.

It is well-known to have frequency-shifted signals corresponding to data symbols 0 and 1 for a transmission having polarization conditions that are orthogonal to one another. Such a two-filter FSK system is disclosed in Electron. Lett. 24 (1988), pp. 358–360. However, polarization insensitive reception requires high frequency shifting and large receiver bandwidths despite low data rates. Further, this method is only suitable for a two-filter FSK system.

In polarization scrambling, the polarization condition of the optical transmission signal is switched between orthogonal states usually several times during a bit period of the data signal. Moreover the switching signal is usually not synchronized with the data signal.

Prior art optical systems exhibit a dependency on polarization which yields poor transmission quality.

SUMMARY OF THE INVENTION

An object of the invention is to provide a method of synchronized polarization switching where the polarization condition of the optical transmission signal can be switched less often.

The above object can be achieved with a device constructed in accordance with the principles of the invention. The device only requires one switch-over per clock period of the signal that clocks the optical transmission signal. To operate the polarization switch used for polarization switching the drive circuit for the switch only requires the clock signal that clocks the optical transmission signal. The switching can be performed in a way that signal components of identical amplitudes, that are orthogonal to one another, arrive at the receiver of the transmission system. One advantage of the method of the present invention is that it is suitable for both ASK (amplitude shift keying) modulation and FSK (frequency shift keying) modulation. It can also be utilized in one-filter FSK systems. Since the polarization is switched at the center of the bit, the required receiver bandwidth roughly corresponds to that of standard heterodyne systems having RZ coding.

DESCRIPTION OF THE DRAWING

The FIGURE is a schematic illustration showing a preferred embodiment of an apparatus in an optical heterodyne transmission system for the implementation of the method of the present invention.

DESCRIPTION OF THE PREFERRED EMBODIMENT

The heterodyne transmission system illustrated in the FIGURE is composed of a clock generator 1 for creating a defined clock for the clocking of the optical transmission signal. Clocking is accomplished by electrical clock pulses $I_T$ having a clock period $T_B$. A modulator 2 is clocked by pulses $I_T$. An electrical data signal d (t), in the form of a bit sequence, is supplied to the modulator 2 and is clocked and modulated with the defined clock creating an output A. The output A of the modulator 2 is an electrical signal that is modulated by the data signal d(t) synchronous with the clock. An electro-optical transducer 3, such as a laser diode or a laser diode followed by an external optical intensity modulator converts the modulated and clocked electrical signal at output A into a polarized FSK-modulated or ASK-modulated optical signal clocked with the defined clock. A polarization switching stage 4 continuously keys the polarization condition of the clocked polarized optical signal that is supplied to it. An optical transmission link 5, such as an optical fiber, transmits the modulated, clocked, and polarization-keyed optical signal from the polarization switching stage 4 to a common optical ASK or FSK super-heterodyne receiver 6. An electrical output signal 61 corresponds to the electrical data signals d(t).

The apparatus of the FIGURE has an advantage over prior art devices because it includes a polarization switching stage 4 that is switched by the clock pulses $I_T$ and is supplied to the polarization switching stage 4 via a delay stage 7. Stage 7 delays each clock pulse by a half clock period $T_B/2$ of a clock pulse $I_T$. As a result, polarization switching occurs in the middle of every clock period and thus of every bit of the modulated optical signal supplied to the polarization switching stage 4. As a result of the present invention, the amplitude of the output signals d(t) at output 61 of the receiver 6 is polarization-independent.

Polarization switching stage 4, as in the apparatus of the present invention, can be constructed in a simple way with phase modulators that have different phase shifts for different orthogonal polarization conditions. Lithium niobate (LiNbO$_3$) phase modulators in a waveguide execution can be used for the polarization switching stage 4. The linearly polarized, optical transmission signal is coupled at an angle of 45°. relative to the principal optical axis of the crystal. The amplitude of the control voltage is set so that the difference in the phase shift between transverse electric polarized light and transverse magnetic polarized light is 180°. Polarization conditions that are orthogonal to one another appear at the output of the phase modulator.

Although modifications and changes may be suggested by those skilled in the art, it is the intention of the inventors to embody within the patent warranted hereon, all changes and modifications as reasonably and properly come within the contribution to the art.

We claim as our invention:

1. A method for synchronized switching of a polarization condition of an optical transmission signal in an optical transmitter, comprising the steps of:

clocking a data signal with a defined electrical clock signal having clock pulses and a clock period at a transmitter side of said optical transmission system; said data signal having bits, and each bit having a center;

modulating an optical transmission signal using said data signal and thereby generating a modulated optical transmission signal;

delaying said electrical clock signal by one-half of said clock period and thereby generating a delayed electrical clock signal;

switching the polarization condition of said modulated optical transmission signal between orthogonal polarization, states by means of said delayed electrical clock signal; and continuously polarization switching the polarization condition of switching said modulated optical transmission signal while being clocked by said delayed electrical clock signal to generate a switching stage output signal of two polarization conditions that are orthogonal to one another while having polarization condition switching occur in a middle of each clock period, so that the center of each of said bits is synchronized with said polarization condition switching and said middle of each clock period of the defined clock.

2. A transmitter for transmitting an optical transmission signal, said transmitter comprising:

modulator means connected to a clock generator having a clock period and connected to a data input signal having first and second states or bits;

delay means connected to said clock generator for generating a delayed electronic signal by one-half of said clock period;

electro-optical transducer means for converting said data input signal into a polarized FSK- or ASK-modulated optical signal; and a polarization condition switching means to which said polarized FSK-modulated or ASK-modulated optical signal and said delayed electronic signal are supplied for generating an optical transmission signal whose polarization condition is switched between orthogonal said polarization condition states, said polarization switching occurring in a middle of each clock period and synchronized with a center of each bit of said data input.

3. A transmitter as claimed in claim 2, wherein said polarization condition switching condition means is an integrated optical waveguide device consisting of birefringent material.

4. A transmitter as claimed in claim 3, wherein said waveguide consists of lithium niobate.

* * * * *